Dec. 15, 1925.
J. HUME
FLUID PRESSURE BRAKE
Filed May 8, 1924
1,565,459
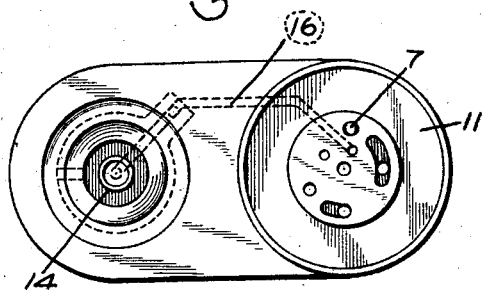
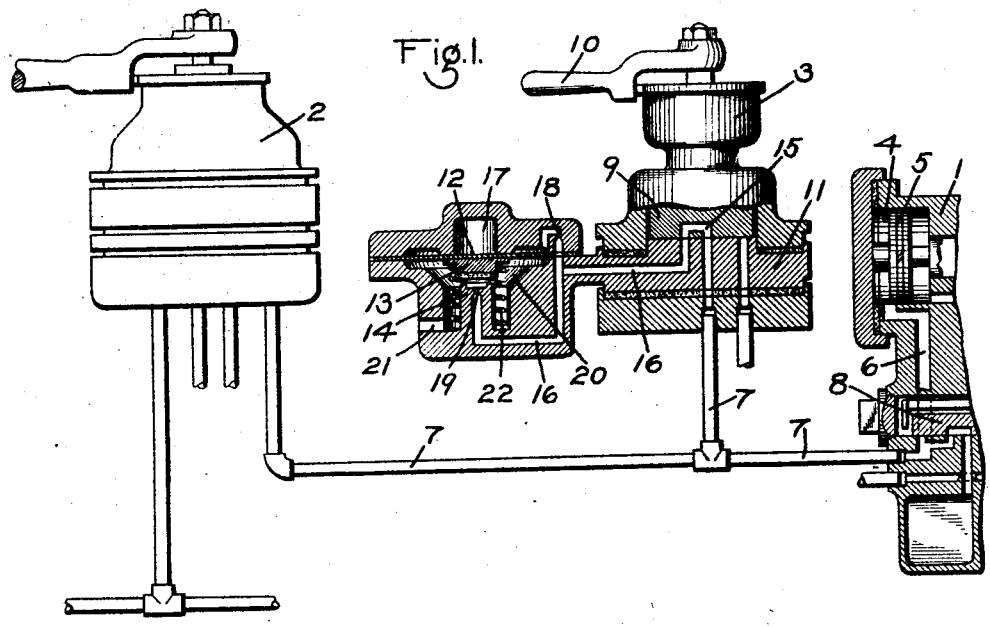
INVENTOR
JOHN HUME
BY *Wm. M. Cady*
ATTORNEY Patented Dec. 15, 1925.

1,565,459

UNITED STATES PATENT OFFICE.

JOHN HUME, OF HOUSTON, TEXAS, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed May 8, 1924. Serial No. 711,850.

*To all whom it may concern:*

Be it known that I, JOHN HUME, a citizen of the United States, residing at Houston, in the county of Harris and State of Texas, have invented new and useful Improvements in Fluid-Pressure Brakes, of which the following is a specification.

This invention relates to fluid pressure brakes, and more particularly to a locomotive brake equipment.

The principal object of my invention is to provide means for preventing the brakes from being applied on the locomotive when not intended, due to leakage and fluctuations in the pressure of fluid supplied by the feed valve.

In the accompanying drawing; Fig. 1 is a diagrammatic view, partly in section, of a locomotive brake equipment embodying my invention; and Fig. 2 a plan view of a casing section associated with the independent brake valve device of said equipment.

The locomotive brake equipment shown in Fig. 1 includes a distributing valve device 1, an automatic brake valve device 2, and an independent brake valve device 3.

The distributing valve device 1 is similar to that employed in the well known E. T. locomotive brake equipment and comprises a casing having an application cylinder 4 containing an application piston 5 and connected by passage 6 to an application cylinder pipe 7. When fluid under pressure is admitted to the application cylinder 4 either by operation of the independent brake valve 3 or by operation of the equalizing slide valve 8, the piston 5 is operated to effect an application of the brakes in the well known manner.

The independent brake valve device 3 comprises a casing containing a rotary valve 9 adapted to be operated by handle 10. According to my invention, in place of the usual valve seat section, there is provided a casing section 11, having a seat for the rotary valve 9 and associated with said casing section is a valve device having a flexible diaphragm 12. On one side of said diaphragm a valve 13 is carried, which is adapted to engage a valve seat 14.

In the running position of the independent brake valve 3, the application cylinder pipe 7 is connected through a cavity 15 provided in the rotary valve 9 with a passage 16 which communicates with diaphragm chamber 17 through a restricted port 18 and with valve seat 14 through a restricted port 19.

The diaphragm chamber 20 at the opposite side of the diaphragm is open to the atmosphere by way of an exhaust port 21 and in chamber 20 is a coil spring 22 which acts on the diaphragm 12.

In operation, with the independent brake valve 3 in running position, the application cylinder 4 is connected through pipe 7 and cavity 15 in the rotary valve 9 to opposite sides of the diaphragm 12 by way of the restricted ports 18 and 19 and the chamber 20 being open to the atmosphere, any pressure slowly leaking into the application chamber 4 will escape by way of the exhaust port 21.

When an application of the brakes is effected by manipulation of the automatic brake valve 2, the pressure in chamber 17 will build up faster than it can escape through the restricted port 19 and the exhaust port 21 and consequently the diaphragm 12 will be moved by the built up pressure in chamber 17 so as to shift the valve 13 to its seat 14, thus cutting off the exhaust of fluid from the application cylinder pipe 7.

When the valve 13 is seated, it will remain there so long as pressure exists in the application cylinder, since the area of the diaphragm exposed to pressure tending to seat the valve exceeds the area exposed to pressure tending to open the valve. After the brakes are released, the spring 22 will operate to return the diaphragm 12 and valve 13 to the open position.

It is deemed unnecessary to illustrate the distributing valve device 1 in its entirety or the construction of the automatic brake valve device, since the operation of similar apparatus is well understood by those skilled in the art.

Having now described my invention, what I claim as new and desire to secure by Letters Patent, is:—

1. In a fluid pressure brake, the combination with an application cylinder and an application cylinder pipe connected to said cylinder, of a valve for venting fluid under pressure from said pipe, a movable abutment, subject to fluid pressure in said pipe for operating said valve, and a brake valve device for controlling communication from said pipe to said movable abutment.

2. In a fluid pressure brake, the combination with an application cylinder and an application cylinder pipe connected to said cylinder, of a valve for venting fluid from said pipe, a movable abutment subject to fluid pressure in said pipe for operating said valve, said valve being subject in its seated position to fluid pressure in said pipe.

3. In a fluid pressure brake, the combination with an application cylinder and an application cylinder pipe connected to said cylinder, of a valve for venting fluid from said pipe, a movable abutment carrying said valve and subject on one side to fluid pressure in said pipe and having the other side exposed to atmospheric pressure, an area of said valve when seated being subject to fluid in said pipe tending to unseat said valve.

4. In a fluid pressure brake, the combination with an application cylinder and an application cylinder pipe connected to said cylinder, of a valve for venting fluid from said pipe, a movable abutment subject on one side to fluid in said pipe as supplied through a restricted port for operating said valve, said valve being subject in its seated position to fluid in said pipe as supplied thereto through another restricted port.

In testimony whereof I have hereunto set my hand.

JOHN HUME.